Dec. 28, 1937.   R. S. WHITTINGTON   2,103,284
AUTOMATIC CONTROL OF CLUTCH AND THROTTLE
ACTUATION OF AN AUTOMOTIVE VEHICLE
Filed July 15, 1932   3 Sheets-Sheet 2
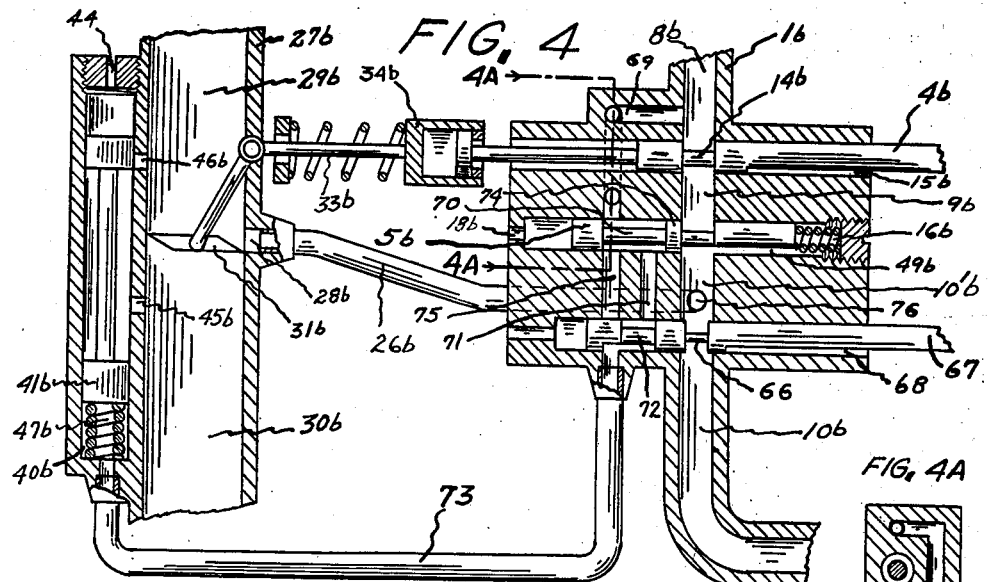
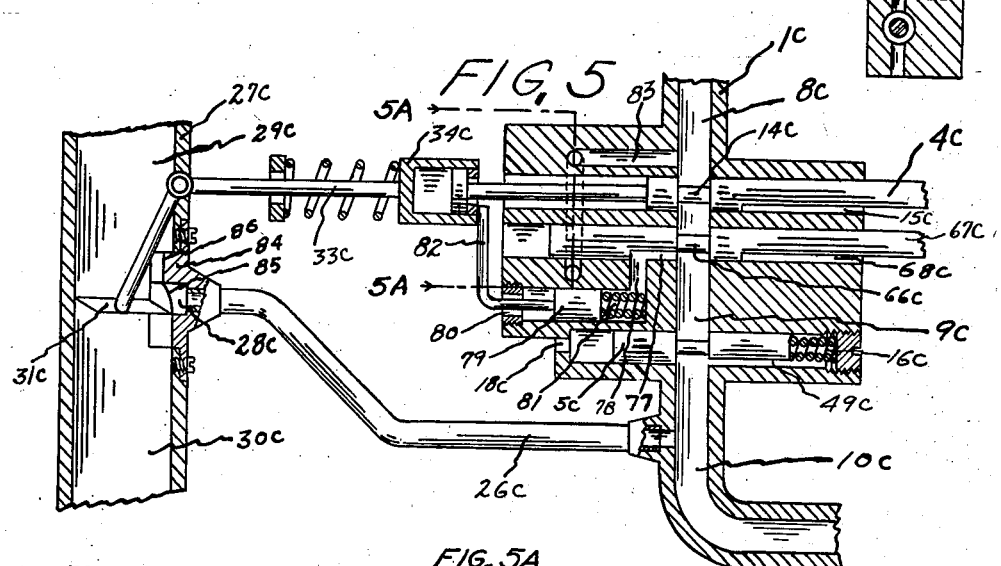
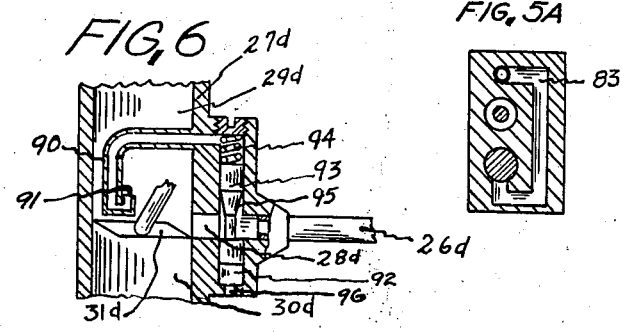
INVENTOR.
Ralph S. Whittington

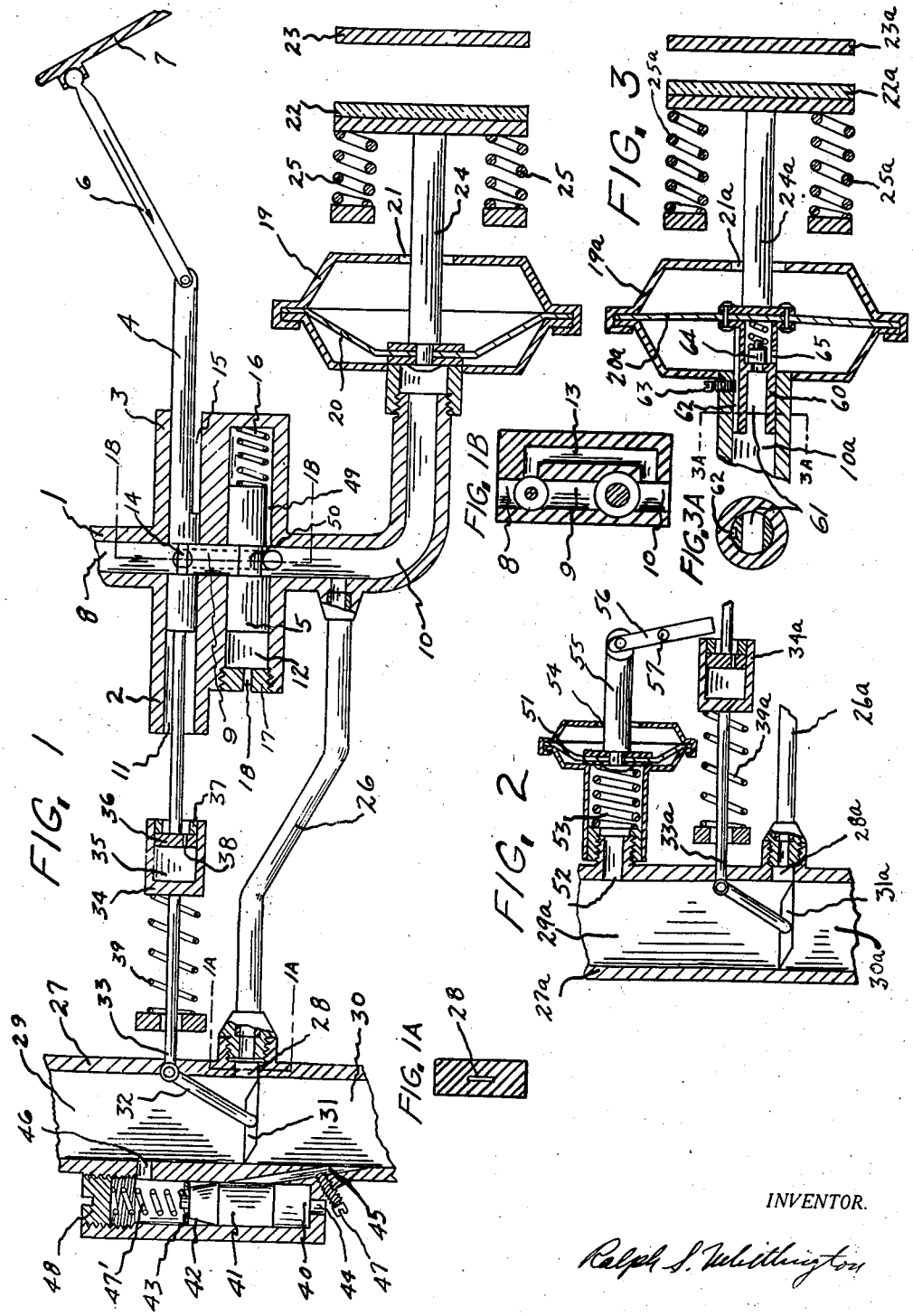

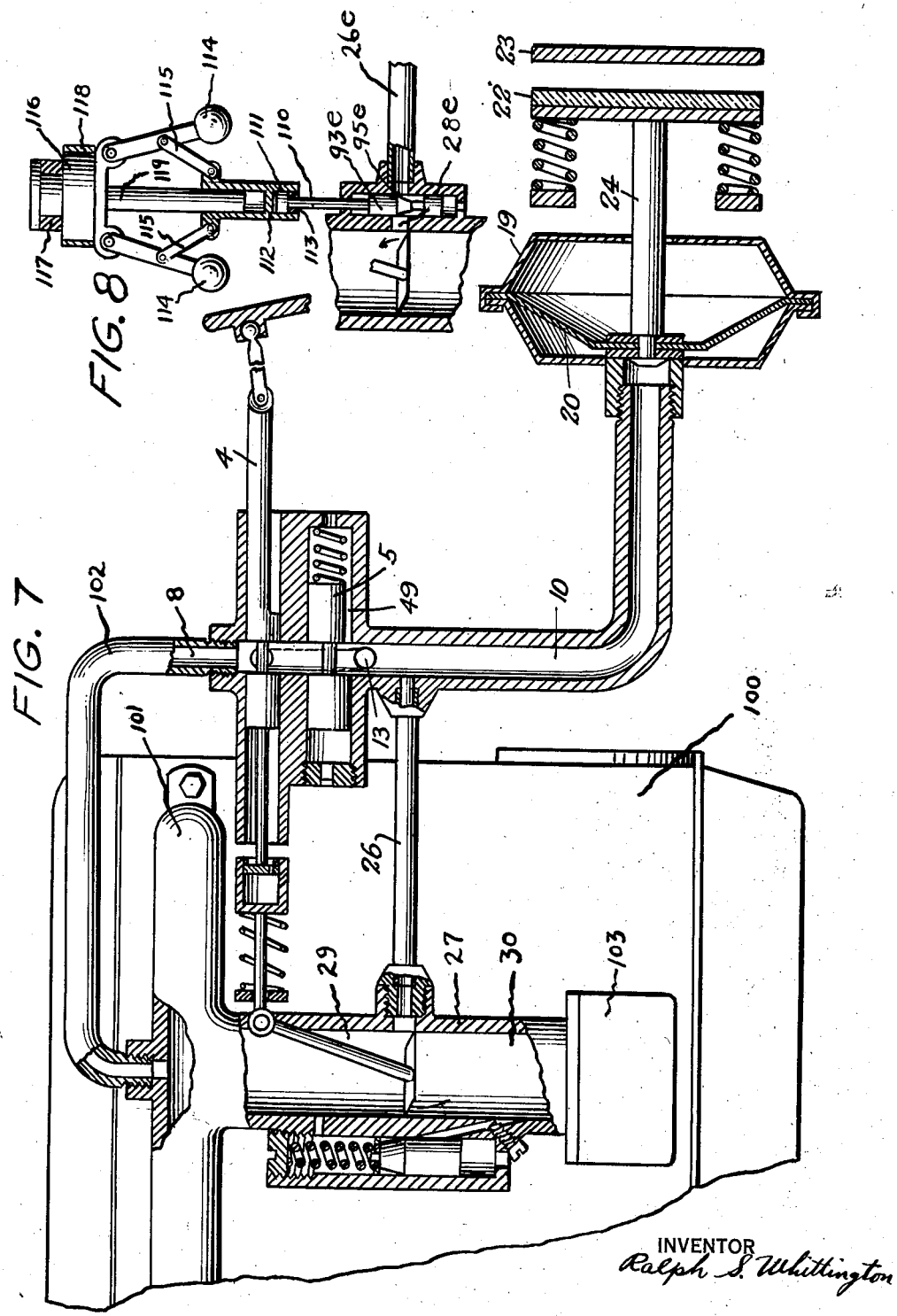

Patented Dec. 28, 1937

2,103,284

UNITED STATES PATENT OFFICE 2,103,284

AUTOMATIC CONTROL OF CLUTCH AND THROTTLE ACTUATION OF AN AUTOMOTIVE VEHICLE

Ralph S. Whittington, Oak Park, Ill., assignor to Bendix Products Corporation, South Bend, Ind., a corporation of Indiana Application July 15, 1932, Serial No. 622,703

11 Claims. (Cl. 192—.01)

This invention relates to an automatic control means for use in controlling the actuation of throttle and clutch of an automotive vehicle in their proper relation.

One of the primary objects of this invention is to provide a control means of the above mentioned character which will automatically control the disengagement and engagement of the clutch plates, and also control automatically the acceleration of the motor during the period that the clutch plates are contacting.

A further object of this invention is to provide a control means of the above mentioned character which will effect a slower contacting of the clutch plates after the vehicle has been free wheeling or coasting for a time, than is obtained when the gears of the transmission are being normally shifted and the accelerator depressed to drive the vehicle.

This invention further contemplates the provision of means whereby the motor may be accelerated more in advance of the contacting of the clutch plates when the accelerator is depressed rapidly, as compared to depressing the accelerator slowly.

Still further this invention contemplates the provision of a control means of the above mentioned character which will allow the clutch plate pressure to increase or decrease accordingly as the accelerator is depressed or released during the range of clutch engagement.

This invention also provides means effecting a slower final contacting of the clutch plates at slow motor speeds than at higher motor speeds, when the accelerator is depressed rapidly.

Numerous other objects and advantages of this invention will become more apparent as the following description proceeds, particularly when reference is made to the accompanying drawings, wherein:

Figure 1 is a semi-diagrammatic view partly in section of a control means constructed in accordance with this invention;

Figure 1A is a fragmentary cross sectional view taken substantially on the line 1A—1A of Figure 1;

Figure 1B is a fragmentary cross sectional view taken substantially on the line 1B—1B of Figure 1;

Figure 2 is a semi-diagrammatic view partly in section of a method optional to the one illustrated in Figure 1, of controlling the acceleration of the motor during clutch contacting.

Figure 3 is a semi-diagrammatic view partly in section of the actuating diaphragm, as shown in Figure 1, with a control valve for this diaphragm;

Figure 3A is a fragmentary sectional view taken substantially on the line 3A—3A of Figure 3.

Figure 4 is a semi-diagrammatic view partly in section of a portion of a system similar to the one in Figure 1, but showing some variations.

Figure 4A is a fragmentary sectional view taken substantially on the line 4A—4A of Figure 4.

Figure 5 is a semi-diagrammatic view partly in section of a modified form of the control illustrated in Figure 4.

Figure 5A is a fragmentary sectional view taken substantially on line 5A—5A of Figure 5.

Figure 6 is a semi-diagrammatic view partly in section of a portion of a control means to be used in connection with a system as illustrated in Figure 1.

Fig. 7 is a semi-diagrammatic view partly in section showing how the system of Fig. 1 is associated with the motor of the vehicle.

Fig. 8 is a view partly in section of a portion of a control means to be used in connection with a system as illustrated in Fig. 1.

In general, this invention provides an automatic control means for the clutch of an automotive vehicle which also accelerates the motor automatically at the instant that the clutch begins to engage. In prior devices of this nature this has been accomplished by means of mechanical connection to the accelerator pedal of such kind that the carburetor throttle valve would be opened the proper amount at the time the clutch started engagement. However, this has been a delicate adjustment and one that required frequent adjustment to secure the proper relation of the throttle valve setting and the beginning of clutch plate contact.

This invention further provides a means of securing the proper clutch plate contact after the vehicle has been free wheeling, or coasting, with the clutch disengaged, and the motor is accelerated to drive the vehicle again. The conditions encountered at this time are entirely different from those encountered while shifting the gears of the transmission and accelerating the motor to drive the car again, for at this time the motor is still revolving at several hundred revolutions per minute, and after the gears have been shifted and the accelerator depressed again, the motor will pick up speed very rapidly. But after the car has been coasting for a time, the motor has had time to slow down to a low speed and is idling. Then when the accelerator is depressed again to drive the car, the motor speed must necessarily require more time to come up to the speed of the car than in the former case where the motor is already turning rapidly. The result is that after free wheeling, the clutch will engage before the motor comes up to the speed of the car, and a jerk is felt as the motor is brought up to speed. This invention provides means of delaying clutch engagement until the motor comes up to speed, after the car has been free wheeling, without slowing up the clutch engagement during the shifting of the gears.

This invention also provides a method of contacting the clutch plates under full control of the accelerator pedal position, giving the operator of the vehicle better control while maneuvering the car in close quarters.

Referring then to the drawings wherein like reference characters designate corresponding parts through all views, there is shown in Figure 1 a system composed of a conduit 1 adapted to be connected by conduit 102 to the intake manifold 101 of the motor of an automotive vehicle which is designated by the numeral 100. Conduit 1 is provided with lateral extensions 2 and 3 which slidably receive piston 4 and valve 5. Piston 4 is connected by linkage 6 to accelerator pedal 7. The conduit 1 is divided into passages 8, 9, and 10 by piston 4 and valve 5. Piston 4 operates in bore 11 to control the communication of passages 8 and 9. Valve 5 operates in bore 12 to control communication between passages 9 and 10. Passage 13 is provided to place passage 8 in communication with passage 10 only at such times that the reduced portion 14 of piston 4 is in alignment with passage 8 as shown in Figure 1 which corresponds to the position of complete release of the accelerator. Piston 4 is also provided with groove 15 adapted to place passage 9 in communication with the atmosphere upon a predetermined movement of piston 4. Valve 5 is actuated by spring 16 and is held in bore 12 by plug 17. Hole 18 opens bore 12 to the atmosphere. Conduit 1 terminates in diaphragm casing 19 placing one side of diaphragm 20 in communication with passage 10. Diaphragm 20 is exposed on its other face to atmospheric pressure through port 21, and is connected to the clutch plate 22 by stem 24. Clutch plate 22 is moved to contact clutch plate 23 by clutch springs 25. Tapped into the passage 10 is the conduit 26 which at its other end is tapped into the carburetor riser 27 at the rectangular port 28. Carburetor riser 27 is divided into passage 29 and passage 30 by carburetor throttle valve 31. Passage 29 is adapted to be connected to the intake manifold of the motor of the vehicle, and passage 30 is adapted to be connected to the carburetor. Carburetor throttle valve 31 is actuated by arm 32 which is linked to the accelerator by rod 33 and piston 4. Rod 33 is provided with the enlarged portion 34 which contains the bore 35 in which the piston 36 is slidably mounted. Piston 36 is formed from an extension of piston 4 and is held in bore 35 by ring 37 pressed into bore 35. Piston 36 is provided with the small hole 38 to open bore 35 to atmosphere. Spring 39 is provided to actuate the throttle valve in opposition to the accelerator pedal. Carburetor riser 27 also contains the bore 40 which slidably receives piston 41 provided with taper 42 which is contacted by ring 43 pressed into bore 40 to form a stop for piston 41. Port 44 exposes piston 41 to atmospheric pressure. Passage 45 containing the adjustable restriction 47 places passage 30 in communication with bore 40 and port 46 communicates between bore 40 and passage 29.

Spring 47' actuates piston 41 and plug 48 closes bore 49.

In the operation of the system passage 8 is subject to the vacuum in the intake manifold and all parts are shown in Figure 1 in the position they occupy while the motor idles. Vacuum from passage 8 first acts through passage 13, groove 49 of piston 5, allowing atmospheric pressure acting through hole 18 to overcome spring 16 and place piston 5 in the position shown in Figure 1. Then by virtue of the reduced portion 50 of valve 5, diaphragm 20 is placed in direct communication with passage 8 allowing atmospheric pressure acting through port 21 on diaphragm 20 to overcome clutch springs 25 and move the clutch plates to the position shown in Figure 1. The gears of the transmission may now be shifted. When the accelerator pedal 7 is depressed valve 4 is moved in the direction of the arrow to cut off vacuum in passage 8 from passage 9 and passage 13, and at approximately the same time place passage 8 in communication with the atmosphere thru groove 15 in piston 4. As air is admitted to passage 9 it passes valve 5 by virtue of the reduced portion 50 and enters diaphragm casing 19 to begin to equalize atmospheric pressure acting on diaphragm 20, but by virtue of clutch springs 25 pulling on diaphragm 20, a vacuum sufficient to overcome spring 16 acting to close valve 5 is developed in passage 10 as the clutch plates move toward engagement.

As soon, however, as the clutch plates begin to contact, the pull of the clutch springs on diaphragm 20 will decrease, causing a drop in vacuum in passage 10. This drop in vacuum will be communicated to the exposed area of valve 5, and spring 16 is of such strength that valve 5 is moved to close passage 9 from passage 10 at some predetermined clutch plate pressure, and further engagement of the clutch must be effected by atmosphere entering passage 10 thru port 28 and conduit 26.

The operation described above takes place when the accelerator pedal 7 is depressed just enough to move valve 4 to shut off vacuum in passage 8, and open passage 9 to the atmosphere thru groove 15 in valve 4. While the accelerator pedal is in this position the throttle valve 31 has moved only slightly, and port 28 is still exposed largely to vacuum in passage 29. Hence vacuum will still exist in conduit 26. This vacuum will be transferred to conduit 10 and the clutch actuating member 20. However, regardless of the degree of vacuum at port 28, the vacuum at passage 10 cannot, while valve 4 opens passage 9 to atmosphere, exceed the vacuum at which valve 5 will allow atmospheric pressure acting thru hole 18 to overcome spring 16, and thus admit more atmosphere from passage 9. Thus valve 5 at this stage acts as a vacuum regulating valve and insures that the clutch will remain partially engaged as long as atmospheric pressure exists in passage 9.

Passage 10 communicates with the carburetor riser through conduit 26 and port 28 which is rectangular in shape but narrow enough to have the proper restriction of its capacity. Port 28 is arranged so that all of its area is exposed to vacuum in passage 29 when the accelerator pedal 7 is completely released, and the throttle valve is in the position shown in Figure 1. However as the throttle valve is opened more of the area of port 28 is exposed to near atmospheric pressure in passage 30. The result is that as valve 31 is opened its edge passes over the face of port 28 producing a continuous drop in vacuum in the conduit 26, and this action results in atmosphere being admitted to passage 10 and diaphragm 20 from passage 30 as the above action takes place. Thus the pressure in passage 10 depends on the proportionate amount of the area of port 28 that is exposed to the vacuum in passage 29 and near atmospheric pressure in passage 30, and the vacuum acting on diaphragm 20, and consequently the clutch plate pressure, can be increased or decreased accordingly as valve 31 is opened or closed. Complete clutch engagement will be obtained when port 28 is completely exposed to near atmospheric pressure in passage 30.

When the accelerator pedal 7 is depressed slowly, as when starting the vehicle, air passes through hole 38 from bore 35 fast enough to prevent the compression of spring 39 and the motion of valve 31 until piston 36 reaches the bottom of bore 35. At approximately the same time piston 4 begins admitting atmosphere to diaphragm 20. The result is that the motor begins to accelerate as the clutch begins to engage. But when the accelerator pedal 7 is depressed rapidly, as after free wheeling, air is compressed in bore 35 due to the limited capacity of hole 38, and spring 39 is compressed resulting in the opening of valve 31 more in advance of clutch engagement. Obviously the clearance of piston 36 in bore 35 could be made of the proper value to accomplish the same result.

During the normal idle of the motor, the vacuum in passage 29 acting thru port 46 on piston 41 overcomes spring 47' and holds piston 41 against stop 43 as shown in Figure 1, due to atmospheric pressure acting thru port 44. But at the instant that the clutch plates begin to contact, there is a drop in vacuum in the intake system of the motor and in passage 29. The drop in vacuum referred to occurs as the clutch begins to engage because at this time the motor begins to develop torque. As the motor is loaded more, the vacuum in the intake system will decrease, and can be made to decrease to a negligible quantity, as when the throttle valve is open wide at low motor speeds. This drop in vacuum begins to equalize atmospheric pressure on piston 41, and allows spring 47' to move piston 41 to uncover passage 45 and admit mixture from passage 30, through passage 45 to bore 40, and through port 46 to the intake system of the motor. Piston 41 is provided with taper 42 so that the greater the drop in vacuum in the intake system during the contacting of the clutch plates, the greater the rate at which mixture is admitted to the intake system to accelerate the motor. Thus a means of accelerating the motor automatically as the clutch begins to engage is provided, and the amount that the motor is accelerated increases as the speed of clutch engagement increases, since the vacuum will drop more in the intake system of the motor when the clutch is engaged more rapidly.

Figure 2 illustrates an alternate method of automatically accelerating the motor as the clutch engages, when incorporated in the system illustrated in Figure 1. During the normal idle of the motor, vacuum in passage 29a acting on diaphragm 51 through port 52 overcomes spring 53 due to atmospheric pressure acting on the opposite face of diaphragm 51 through port 54, and holds stem 55 in the position shown in Figure 2. Lever 56 is attached to stem 55 and pivots at 57. It is arranged to actuate throttle valve control rod 33a in opposition to spring 39a and open throttle valve 31a. The drop in vacuum in passage 29a at the beginning of clutch engagement, begins to equalize atmospheric pressure acting on diaphragm 51 and allows spring 53 to move stem 55 and lever 56 to operate control rod 33a and open throttle valve 31a. This admits more mixture from the carburetor and speeds up the motor as the clutch begins to engage.

In Figure 3 is illustrated a diaphragm controlled clutch with a special valve for the diaphragm to be used in a control system of the nature illustrated in Figure 1. Vacuum in passage 10a acts through slot 61 of valve 60 as long as slot 61 is in register with the interior of diaphragm casing 19a. However as soon as slot 61 completely enters passage 10a, air can be removed from the interior of diaphragm casing 19a to effect further motion of clutch plate 22a, only through grooves 62 of valve 60. Thus vacuum in passage 10a can act to rapidly disengage clutch plates 22a and 23a, but after they have been disengaged some distance, their further motion apart is made much slower by the closing of the passage through the slot 61. Adjustable restriction 63 in grooves 62 makes possible an adjustment of the speed at which the clutch plates continue to move apart after slot 61 completely enters passage 10a. When vacuum is released in passage 10a and atmosphere is allowed to enter it to effect an engagement of the clutch, one way check valve 64 opens due to the fact that pressure in passage 10a is greater than in the diaphragm casing 19a, and provides an additional path for air to flow from passage 10a to casing 19a to effect a clutch engagement. Port 65 is provided to govern the capacity of this path. Thus, after slot 62 has completely entered passage 10a, a path of two capacities is provided between passage 10a and the interior of diaphragm casing 19a, the path having a greater capacity when motion of air is toward diaphragm casing 19a, but being controllable in capacity in both directions. The result is that while the gears of the transmission are being normally shifted, the clutch will be disengaged only approximately to the point where all of slot 62 enters passage 10a, because the interval of time that the accelerator is released is small, and consequently vacuum will not be present in passage 10a for any length of time. This is desirable since a quick engagement of the clutch is desired at this time, because the motor is turning fast when the accelerator is depressed and it will come up to speed comparatively fast. But when the car has been free wheeling for a time and the motor speed has reduced to an idle, vacuum has been present in passage 10a for some time, and the action of this vacuum through groove 62 will have moved the clutch plates to the maximum distance apart. Then when the motor is accelerated to drive the car again, the contacting of the clutch plates will be delayed the proper amount by the combined capacity of the path through groove 62 and one way check valve 65, which path must be the proper capacity to delay the contacting of the clutch plates until the motor, which has been idling and will come up to speed slower, has had time to come up to the proper speed. Thus a means is provided that takes care of the different conditions existing while shifting the gears of the transmission and while starting to drive the car again after it has been free wheeling or coasting.

The object in retarding the motion of the clutch plate 22a toward released position during the latter part of this motion, is to provide a means of delaying the next engagement of the clutch in proportion to the time that the motor has been idling. This is desirable, since the longer the motor has been idling the slower it will be running, and hence the longer it will take to come up to speed again when the accelerator is depressed again. Due to the check valve 64 and the port 65, the clutch engagement will always be delayed in proportion to the amount of air that must pass thru port 65 to effect a clutch engagement, and this quantity of air will increase as the position of the clutch plate 22a changes to the left in Fig. 3, this position being considered as the starting point for clutch engagement as the accelerator pedal is depressed to start a clutch engagement.

In Figure 4 is illustrated a modified form of control to be used in a system as illustrated in Figure 1. Carburetor riser 27b is divided into passages 29b, which is adapted to be connected to the intake manifold, and 30b, which is adapted to be connected to the carburetor, by the throttle valve 31b. Thus port 28b is subject to the vacuum of the intake manifold when throttle valve 31b is closed, and is made subject to near atmospheric pressure in passage 30b as the throttle valve is opened.

Conduit 1b is adapted to be connected to the intake manifold, subjecting passage 8b to the vacuum in the intake manifold. Piston 4b is controlled by the accelerator pedal and its position in Figure 4 corresponds to complete release of the accelerator. Vacuum acts by valve 4b by virtue of reduced portion 14b of valve 4b. As the motor idles vacuum also acts thru port 28b and conduit 26b, thru port 76 to passage 10'b and thru groove 49b of valve 5b. This allows atmospheric pressure acting thru hole 18b to overcome spring 16b and move valve 5b to the position shown in Figure 4. Vacuum can then act from passage 8b by valve 5b and past valve 67 by virtue of reduced portion 66 of valve 67, to passage 10b. The direct opening thus provided from passage 8b to passage 10b allows the clutch to be completely disengaged.

When the accelerator pedal is depressed piston 4b is moved to close off vacuum from passage 8b, and introduce atmosphere into passage 9b thru groove 15b of piston 4b. Thus atmosphere moves directly to passage 10b and allows the clutch to move toward engagement. When the clutch plates have partially engaged, valve 5b closes passage 9b from passage 10'b due to the drop in vacuum in passage 10'b at the initial contacting of the clutch plates as previously described.

Vacuum in passage 8b acts thru passage 69, past reduced portion 70 of valve 5b, thru passage 71, past reduced portion 72 of valve 67, thru conduit 73 to bore 40b. Atmospheric pressure acting thru hole 44 overcomes spring 47b and holds piston 41b in the position shown in Figure 4.

However as soon as valve 5b moves to close passage 9b from passage 10'b, the enlarged portion 74 of valve 5b cuts off passage 71 from vacuum in passage 8b and subjects passage 71 to the decreasing vacuum in passage 10'b. This drop in vacuum is transferred thru conduit 73 to piston 41b. Spring 47b is of such strength that piston 41b is moved to uncover port 46b when the vacuum in passage 10'b drops to some predetermined value, which can correspond to any clutch plate pressure.

Also if passage 71 is moved nearer to passage 10'b it will be in communication with passage 10'b thru groove 49b of valve 5b before valve 5b closes passage 9b from passage 10'b. Thus valve 41b can be made to respond to atmospheric pressure in varying degrees according to the location of passage 71, resulting in earlier acceleration of the motor with reference to the contacting of the clutch, as passage 71 is moved toward passage 10'b.

Control valve 67 is to be operated by the driver of the vehicle to render the whole automatic system inoperative at will. When control valve 67 is moved inward, vacuum from passage 8b is shut off from passage 10b at all times, and passage 10b is placed in communication with the atmosphere through groove 68, rendering the clutch operating diaphragm inoperative. Also, passage 71 is closed by control valve 67 and passage 75 is opened. Thus, passage 10'b is always closed from conduit 73 and passage 8b is always open to conduit 73, so that full manifold vacuum always acts on piston 41b to make the automatic accelerating feature inoperative while starting the vehicle. Also, conduit 26b is tapped into passage 10'b at port 76 above control valve 67, so that valve 67 will entirely shut off vacuum from the clutch actuating diaphragm.

In Figure 5 a still further modified form of control is illustrated. Conduit 1c is adapted to be connected to the intake manifold so that vacuum from the intake system acts in passage 8c. Piston 4c is operated by the accelerator pedal, and is shown in Figure 5 in the position it occupies at complete release of the accelerator pedal. Vacuum can then act by piston 4c by virtue of reduced portion 14c, and by reduced portion 68c of valve 67c to passage 9c.

Carburetor riser 27c is divided into passage 29c, adapted to be connected to the intake manifold, and passage 30c, adapted to be connected to the carburetor, by carburetor throttle valve 31c. Then port 28c is subject to the vacuum of the intake manifold as the motor idles and is made subject to near atmospheric pressure in passage 30c as the throttle valve 31c is opened. As the motor idles vacuum acts through port 28c, through conduit 26c to passage 10c, and then through groove 49c of valve 5c. Atmospheric pressure can then act through hole 18c to hold valve 5c in the position shown in Figure 5. Thus, a direct passage from passage 8c to passage 10c is provided, allowing vacuum from the intake system to release the clutch.

Vacuum also acts through groove 77 of valve 67c and passage 78 on valve 79 allowing atmospheric pressure acting through hole 80 to overcome spring 81 and hold valve 79 in the position shown in Figure 5.

When the accelerator is depressed valve 4c moves to shut off vacuum from passage 8c and allows atmosphere to enter passage 9c through groove 15c in valve 4c. This allows the clutch plates to move toward engagement, as the action of the clutch springs hold valve 5c open as previously described until the clutch plates contact, when valve 5c closes passage 9c from passage 10c, due to the drop in vacuum in passage 10c at the initial contacting of the clutch plates.

Also, the reduction of vacuum in passage 9c allows spring 81 to move valve 79 and arm 82 attached to valve 79 contacts the enlargement 34c of carburetor throttle valve control rod 33c. Thus spring 81 can act to open the carburetor throttle valve as soon as atmosphere is admitted to passage 9c.

Control valve 67c is to be operated by the driver of the vehicle to render the automatic control system completely inoperative when desired. When piston 67c is moved inward, passage 8c is closed from passage 9c regardless of the accelerator position, and passage 9c is in communication with the atmosphere thru groove 68c of piston 67c. Thus the clutch cannot be completely released by vacuum acting thru conduit 26c. Air will be drawn thru conduit 26c but the quantity need not be great enough to disturb the carburetion of the motor.

Also as control piston 67c is moved inward, vacuum from passage 8c is allowed to act thru passage 83 and groove 77 of control piston 67c to passage 78, and on piston 79, holding piston 79 in the position shown in Figure 5. This prevents the automatic acceleration of the motor while starting the vehicle manually.

Door 84 is attached to one side of the carburetor riser and provided with the concave surface 85 which conforms to the movement of throttle valve 31c. As the throttle valve 31c is opened, the edge of the throttle valve passes directly over the face of port 28c without creating an opening of the throttle at this point. Thus an accurate means is provided of subjecting varying areas of port 28c to vacuum in passage 29c, and near atmospheric pressure in passage 30c. The use of door 84 makes possible the machine production of concave surface 85. Projection 86 is provided so that as the throttle valve is opened past the end of radius 85, the throttle opening at this point will start gradually.

In Figure 6 is illustrated a method of automatically controlling the capacity of the conduit 26 in a system as illustrated in Figure 1. This system can be used in any clutch control that uses an atmospheric bleed to complete the clutch engagement. In its operation in connection with a system as illustrated in Figure 1 the carburetor riser 27d is adapted to be connected to the intake system and the carburetor throttle valve 31d divides the carburetor riser into passage 29d which communicates with the intake system, and passage 30d which is adapted to be connected to the carburetor. The conduit 90 is mounted in the interior of the carburetor riser and its open end 91 communicates with passage 29d just above the throttle valve, and points in the direction of the flow of gases in the riser. The other end of conduit 90 communicates with the bore 92 which slidably receives the piston 93. Spring 94 actuates piston 93 to reduce the capacity of port 28d and conduit 26d. Taper 95 is provided on the piston 93 to vary the restriction of port 28d.

When the throttle valve 31d is closed, vacuum in passage 29d acts thru the conduit 90 and on the piston 93 allowing atmospheric pressure acting thru hole 96 to overcome spring 94 and hold piston 93 in the position shown in Figure 6. Also when the throttle valve 31d is moved past the port 28d slowly, the vacuum in passage 29d is still great enough to hold piston 93 in the position shown (or approximately) in Figure 6 until after the port 28d has been passed by valve 31d.

When however the vehicle is at rest and the throttle valve is opened rapidly, the clutch plates will move rapidly toward contact until they have contacted slightly, and the completion of the contacting of the clutch plates will be done gradually by the action of piston 93 since air must move thru conduit 26d to complete the clutch engagement. This is true because the drop in vacuum in passage 29d will be great enough to allow spring 94 to move piston 93 to bring taper 95 in register with the port 28d, and the greater the drop in vacuum in passage 29d the greater will be the restriction of port 28d.

When however the throttle valve is opened rapidly with the motor turning rapidly, as when normally shifting the gears, considerable vacuum will exist at port 91 due to the velocity of gases in passage 29d. This is true because of the direction port 91 faces, and because of the action of the gases around the throttle valve 31d. There are numerous points around the throttle valve and in the intake system generally at which vacuum will exist in increasing amounts as the motor speed is increased with a wide open throttle (or approximately). The strength of spring 94 is such that the above vacuum will hold piston 93 to decrease the restriction of port 28d as compared to the restriction in the former case. Thus it is obvious that by the correct location of port 91 and the correct design of piston 93 and spring 94 and other related parts, the system can be made to allow a slower final contacting of the clutch plates when the throttle valve is opened rapidly and the motor is turning slowly than under the same conditions with the motor turning rapidly, and that the faster the motor is turning the faster the final engagement of the clutch will be made. It is also obvious that the same principle could be applied to other systems employing an atmospheric bleed to complete the clutch engagement, such as a system employing an accelerator controlled bleed to the atmosphere. Likewise a centrifugal device could be used to decrease the restriction of the port 28d as the motor speed increased.

Such a device is shown in Fig. 8 and is to be used in connection with a system as illustrated in Fig. 1 and Fig. 7. In this control means, the valve 93e controls communication between the port 28e and the conduit 26e. The valve 93e is provided with the taper 95e whereby the restriction of port 28e is decreased as the valve 93e moves upward and increases as the valve 93e is moved downward. The valve 93e is further provided with the stem 110 having an enlarged end 111. The end 111 fits in a bore in the member 112 and is held in position by the ring 113 which is pressed into the member 112, causing the valve 93e to move up or down as the member 112 moves, but allowing the member 112 to rotate about the end 111 of stem 110. The governors 114 are pivotally connected to the member 112 by means of arms 115. Likewise, the governors 114 are pivotally connected to the pulley 116 which is supported by the bearing 117 and driven by a belt 118 which is adapted to operate from the motor pump shaft or other convenient means. Integral with the pulley 116 is the guide shaft 119 on which the member 112 reciprocates.

Thus when the motor is not running, or is running at some predetermined slow speed, the governors 114, due to their weight will occupy the position shown in Fig. 8. The length of the valve stem 110 will determine the degree of restriction of port 28e. Then as the speed of the motor increases, the governors 114, due to their centrifugal force, will move upward. This motion will move valve 93e upward, and due to the taper 95e of valve 93e, the restriction of port 28e will be decreased as the motor speed increases. Thus a system is provided in which the capacity of the conduit controlling the final clutch engagement, conduit 26e, increases with the motor speed, and hence effects a more rapid clutch engagement as the motor speed increases. Also in the operation of a control such as illustrated in Figure 6, the general drop in vacuum in the intake system as the torque developed by the motor increases is a condition favorable to the proper action of this system, since as the clutch begins engaging the motor torque will increase and cause a decrease of vacuum in the intake system which will automatically tend to soften the completion of clutch engagement.

This system will also assist in securing a better clutch engagement after the vehicle has been free wheeling or coasting and the motor has been idling, and the accelerator is depressed to drive the vehicle again. This is true because the opening of the throttle under the above conditions will reduce the vacuum acting on the piston 93 sufficiently to close or restrict the port 28d, and thus delay the final engagement of the clutch giving the motor more time to come up to the speed of the vehicle.

What I claim as my invention is:

1. In a system of the class described, the combination with the intake system, the carburetor and a mechanism for controlling the acceleration of the motor, of a pressure responsive means for releasing the clutch, means providing a passage between said pressure responsive means and said intake system, means operative, when the aforementioned mechanism is released, to open said passage whereby vacuum from said intake system actuates said pressure responsive means to release the clutch, means operating upon the actuation of said aforementioned mechanism to reduce the vacuum acting on said pressure responsive means whereby the clutch is moved toward engaged position, and means responsive to pressure changes accompanying the operation of said system, and being operative at a predetermined drop in vacuum in said system, to admit more mixture to said intake system.

2. In a system of the class described, the combination with the intake system, the carburetor and a mechanism for controlling the acceleration of the motor, of a pressure responsive means for releasing the clutch, means providing a passage between said intake system and said pressure responsive means, means operative, when the aforementioned mechanism is released, to open said passage whereby vacuum from said intake system actuates said pressure responsive means to release said clutch, means operating upon the actuation of said aforementioned mechanism to reduce the vacuum acting on said pressure responsive means whereby the clutch is moved toward engaged position, and a by-pass of the throttle valve of said carburetor, said by-pass forming a passage from said carburetor to said intake system when vacuum in said system decreases upon the actuation of said aforementioned mechanism to some predetermined value.

3. In a system of the class described, the combination with the intake system, the carburetor and a mechanism for controlling the acceleration of the motor, of a pressure responsive means for releasing the clutch, means providing a passage between said intake system and said pressure responsive means, means operative, when the aforementioned mechanism is released to open said passage whereby vacuum from said intake system actuates said pressure responsive means to release said clutch, means operating upon the actuation of said aforementioned mechanism to reduce the vacuum acting on said pressure responsive means whereby said clutch is moved toward engaged position and means responsive to vacuum in said intake system, and being operative at a predetermined drop in vacuum in said intake system to admit more mixture from said carburetor to said intake system.

4. In a system of the class described, the combination with the intake system, the carburetor and a mechanism for controlling the acceleration of the motor, of a pressure responsive means for releasing the clutch, means providing a passage between the intake system and said pressure responsive means, means operative, when the aforementioned mechanism is released, to open said passage whereby vacuum from said intake system actuates said pressure responsive means to release said clutch, means operating upon the actuation of said aforementioned mechanism to reduce the vacuum acting on said pressure responsive means whereby said clutch is moved toward engaged position, and means responsive to the admission of atmosphere to said system by said aforementioned mechanism, and being operative at a predetermined drop in vacuum to admit more mixture from said carburetor to said intake system.

5. In a system of the class described, the combination with the intake system, the carburetor throttle valve, and a mechanism for controlling the acceleration of the motor, of a pressure responsive means for releasing the clutch, means providing a passage between said intake system and said pressure responsive means, means operative, when the aforementioned mechanism is released, to open said passage whereby vacuum from said intake system actuates said pressure responsive means to release said clutch, means operating upon the actuation of said aforementioned mechanism to reduce the vacuum acting on said pressure responsive means whereby said clutch is moved toward engaged position, and means responsive to the admission of atmosphere to said system by the actuation of said aforementioned mechanism, and being operable at a predetermined drop of vacuum to complete a by-pass of said carburetor throttle valve, said by-pass admitting more mixture from said carburetor to said intake system.

6. In an automotive vehicle provided with a carburetor, an intake manifold and a clutch, power means for operating the clutch including a pressure differential operated motor operably connected to the clutch, and valve means for synchronously controlling the clutch engaging operation of said motor and the passage of combustible mixture from the carburetor to the manifold.

7. In an automotive vehicle provided with a carburetor, an intake manifold and a clutch, power means for operating the clutch including a pressure differential operated motor operably connected to the clutch, and valve means for synchronously controlling the clutch engaging operation of said motor and the admission of combustible mixture to the manifold, said valve means including an automatically operated valve for by-passing a quantity of said mixture from the carburetor to the manifold.

8. In an automotive vehicle provided with an engine and driving and driven clutch members, means for increasing the speed of the engine when the clutch members contact one with another, said means including a pressure differential operated valve.

9. In an automotive vehicle provided with a carburetor riser, a throttle valve, and a clutch having driving and driven members, power means for operating the clutch comprising means for effecting a relatively rapid engaging movement of the clutch up to a point where the clutch members contact, together with means, operative in conjunction with the operation of the throttle, for effecting a controlled and relatively slow completion of the engagement of the clutch, said latter means comprising an opening in the carburetor riser cooperating with the throttle.

10. In an automotive vehicle provided with an engine, a throttle, and a clutch having driving and driven members, power means for operating the clutch comprising means for effecting a relatively rapid engaging movement of the clutch up to a point where the clutch members contact, means, operative in conjunction with the operation of the throttle, for effecting a controlled and relatively slow completion of the clutch engagement, together with means, automatically operable when the clutch plates contact, for increasing the speed of the engine.

11. In an automotive vehicle provided with an engine, a throttle, and a clutch having driving and driven members, means for operating the clutch, said means including means, operable when the clutch members contact, to slow up the engagement of the clutch, means, operable in direct proportion to the degree of throttle opening, for controlling the completion of the clutch engagement, together with means, automatically operable when the clutch plates contact, for increasing the speed of the engine.

RALPH S. WHITTINGTON.

DISCLAIMER 2,103,284.—*Ralph S. Whittington*, Oak Park, Ill. AUTOMATIC CONTROL OF CLUTCH AND THROTTLE ACTUATION OF AN AUTOMOTIVE VEHICLE. Patent dated December 28, 1937. Disclaimer filed November 7, 1938, by the assignee, *Bendix Products Corporation*.

Hereby enters this disclaimer to claim 6 of said patent.

[*Official Gazette December 6, 1938.*]